United States Patent [19]
Kai et al.

[11] Patent Number: 5,852,750
[45] Date of Patent: Dec. 22, 1998

[54] ATTITUDE ADJUSTMENT DEVICE AND METHOD

[75] Inventors: Tadao Kai, Kawasaki; Hidenori Miyamoto, Urayasu, both of Japan

[73] Assignee: Nikon Corporation, Tokyo, Japan

[21] Appl. No.: 900,872

[22] Filed: Jul. 25, 1997

Related U.S. Application Data

[63] Continuation of Ser. No. 735,436, Jan. 2, 1997, abandoned, which is a continuation of Ser. No. 238,838, May 4, 1994, abandoned.

[30] Foreign Application Priority Data

May 6, 1993 [JP] Japan ................................ 5-105735

[51] Int. Cl.$^6$ .......................................... G03B 17/00
[52] U.S. Cl. .................................................. 396/55
[58] Field of Search ............................... 396/52–55

[56] References Cited

U.S. PATENT DOCUMENTS 4,470,124  9/1984  Tagami et al. ........................ 364/571

FOREIGN PATENT DOCUMENTS 1-291165  11/1989  Japan .
5-107623   4/1993  Japan .

OTHER PUBLICATIONS

Sony Video Tape Recorder CCD–TR 900, Nikkei Electronics, Jul. 6, 1992, No. 558, pp. 203–211 (including English Language Abstract).

Primary Examiner—David M. Gray

[57] ABSTRACT

An attitude adjustment device for use with a detector device which is used to detect rotational motion about an axis of a unit in which the attitude adjustment device is disposed. The attitude adjustment device includes, but is not limited to, a first adjustment mechanism to adjust the angle of the detector device such that the above-mentioned axis is parallel to a standard axis and is parallel to a first plane. Also, the attitude adjustment device includes a second adjustment mechanism to adjust the angle of the detector device such that the above-mentioned axis is parallel to a second plane which is orthogonal to the first plane and is parallel to the standard axis. Also, the present invention provides a method for adjusting the angular relationship between an angular velocity meter of a photographic device and the photographic device. The photographic device includes a photographic optical system, an angular velocity meter, and an adjustment member to adjust the angular relationship between a baseplate of the adjustment member and a housing of the photographic device. The method includes the step of causing a rolling motion to be realized by the photographic device. The rolling motion occurring about an optical axis of the photographic optical system. Also, the method includes the step of adjusting the angular relationship between the angular velocity meter and the photographic device.

16 Claims, 8 Drawing Sheets

ATTITUDE ADJUSTMENT DEVICE AND METHOD

This application is a continuation of application Ser. No. 08/735,436, filed Jan. 2, 1997, now abandoned, which is a continuation of 08/238,838, filed May, 1994, abandoned.

BACKGROUND OF THE INVENTION

1. Technical Field

The present invention relates to attitude adjustment devices and methods used for preventing the effects of hand tremor and the like on photographic cameras.

2. Description of the Related Art

In recent years, there have been various proposals for preventing blurring of photographic images caused by hand tremor and the like (hereinafter "blurring motions"). In a camera equipped with a blur prevention device, a detector is arranged to detect blurring motions. Based on the amount of blurring motion detected, an optical system for image blur correction is moved in directions orthogonal to the optical axis of the optical system to prevent an ultimate image from becoming distorted. For example, in JP-A-1-291165 [Japanese Laid-Open Patent Publication 1-291165], a pair of accelerometers are disposed about a tubular barrel and are used in the pitch direction Dp and in the yaw direction Dy to detect an amount of blurring motion (See FIG. 8). Also disclosed in the JP-A-1-291165 reference is a device which uses angular velocity meters instead of accelerometers.

In accurately driving the correction of the optical system to eliminate image blurs with a high level of efficiency and accuracy, accurate detection of blurring motions is important. In the above-mentioned Japanese reference, accurate detection of blurring motions is difficult due to numerous factors associated with accelerometer characteristics. To attempt to provide greater accuracies, methods of eliminating bad effects due to gravitational acceleration are disclosed in the JP-A-1-291165 reference. Also disclosed in the JP-A-1-291165 reference are methods for uniformly performing rotational positioning combinations in the pitch direction and in the yaw direction of a camera in relation to the angular accelerometers which are disposed around the tube.

In view of recent developments associated with vibrational type angular velocity meters, it is likely that future angular velocity meters will be used as elements for the detection of the above-mentioned blurring motions. In particular, an angular velocity meter, because it detects the rotational angular velocity of a given direction of rotation, detection is possible by arranging an angular velocity meter so as to detect pitch direction blurring motions and another angular velocity meter to detect yaw direction blurring motions. The term "pitch" is meant to cover camera rotational motion in a vertical direction centered on a transverse direction horizontal axis Xp (See FIG. 8). Moreover, the term "yaw" is meant to cover a camera's rotational motion in a horizontal direction centered on a vertical axis Xy. Both axes Xp and Xy are respectively perpendicular to the optical axis L of a photographic lens, and are also in a mutually orthogonal relationship to one another.

The angular velocity meters disclosed in, for example, JP-A-2-228518, are such that the oscillator to set the above-mentioned detection axis is supported in space by means of a wire type of support member. Because such a support member is constituted as fixed to the body of a camera, the direction of the detection axis relative to the camera body by individual angular velocity meters is conflicting. Accordingly, when mounting an angular velocity meter in a camera, it is necessary to adjust its attitude in order to direct its detection axes in the desired direction. If attitude adjustment is unsuitable, for example, the output of the angular velocity meter used for pitch blur detection happens to include a yaw component, and accordingly, accurate detection of blurring motions becomes difficult and possibly impossible.

Nevertheless, in the device disclosed in JP-A-1-291165, two angular velocity meters are integrally mounted and fixed about a tube in a camera body. Accordingly, it is only possible to perform a uniform combination of rotational position in the pitch direction and in the yaw direction.

With cameras generally, blurring motions are realized in a rotational direction centered about an optical axis L. This form of blurring motion is referred to as "roll blur." In considering roll blur, if attitude adjustment of the above-mentioned angular velocity meters is not accurately performed, the output of the angular velocity meter for pitch blur detection and the output of the angular velocity meter for yaw blur detection also contain roll blur components. Accordingly, in a similar manner to that mentioned above, accurate blurring motion detection becomes impossible.

In considering roll blur, rotational motion about some rotation center axis will be considered. The rotational angular velocity is denoted by R, and in order to detect the rotational angular velocity, if the angle included by detection axis of an angular velocity meter and the above-mentioned rotational center axis is denoted by γ (degrees), the output Vr of the above-mentioned angular velocity meter is represented by the following equation:

$$Vr = A \times R \times \cos(\gamma) \quad (1)$$

Where A is a gain constant.

In the case that the detection axis of the angular velocity meter and the rotation center axis are completely in agreement, the following is true: γ=0° so that cos(γ)=1, and Vr=A×R. However, in the case in which the angle between the detection axis and the rotation center axis becomes γ1, the output of the above-mentioned angular velocity meter becomes Vr×cos(γ1). Of course, when γ1=90°, Vr=0.

An example of the above-mentioned equalities is seen in FIG. 9. In FIG. 9, the detection axis of the angular velocity meter 11 (yaw blur detection) is in a plane perpendicular to the photographic optical axis. More particularly, in a plane deviating down from the normal rotation center axis Xy by γ2 (a small angle in proportion to 90°, but not=0). Accordingly, when the camera makes a rotational motion in axis Xy, the output of the angular velocity meter for use in yaw blur detection becomes Vr×cos(γ2), and because cos(γ2) can be regarded as approximately equal to 1 when γ2 is of small magnitude, the output can be regarded as approximately Vr. In particular, a deviation of the above-mentioned detection axis from the optical axis direction, does not have a very bad effect as regards yaw blur.

However, rotation about a rolling rotation axis, that is, relating to roll blur, the output of the angular velocity meter used for yaw blur detection becomes:

$$Vr \times \cos(90° - \gamma 2) = Vr \times \sin(\gamma 2) \quad (2)$$

The quantity expressed in equation [2] rapidly becomes larger when γ2 increases. For example, at γ2=3°, Vr×5.2%; at γ=5°, Vr×8.7%. Accordingly, there essentially results an excessive amount of roll blur, included in a comparatively large proportion, in the output of the angular velocity meter used for yaw blur detection, and therefore, accurate detection results cannot be obtained.

SUMMARY OF THE INVENTION

It is an object of the present invention to provide an attitude adjustment device for motion detectors used with cameras so that accurate motion detection is realized.

It is still another object of the present invention to provide an attitude adjustment device which allows for the detection of blurring motions with little impact from roll blur and the like.

It is a further object of the present invention to provide an attitude adjustment device which can be easily disposed in a camera structure and which is easily adjusted when mounted.

It is a further object of the present invention to provide an attitude adjustment device which utilizes angular velocity meters to detect blurring motion and the like.

These and other objects and advantages are provided by the present invention in that disclosed is an attitude adjustment device for use with a detector device which is used to detect rotational motion about an axis of a unit in which the attitude adjustment device is disposed (e.g., in a camera). The attitude adjustment device includes, but is not limited to, a first adjustment mechanism to adjust the angle of the detector device such that the above-mentioned axis is parallel to a standard axis and is parallel to first plane. Also, the attitude adjustment device includes a second adjustment mechanism to adjust the angle of the detector device such that the above-mentioned axis is parallel to a second plane which is orthogonal to the first plane and is parallel to the standard axis.

The present invention also embodies an attitude adjustment device having a first detector and a second detector. The first and second detectors detect a physical quantity (e.g., roll motion) related to rotational motion of an object about a detection axis. The first and second detectors are mounted in the object. The attitude adjustment device includes, but is not limited to, a first adjustment mechanism to adjust the angle of the first detector such that the detection axis of the first detector in the object becomes parallel to a first plane and parallel to a standard axis. Additionally, a second adjustment mechanism is included to adjust the angle of the first detector such that the detection axis of the first detector becomes parallel to a second plane which is orthogonal to the first plane and also parallel to the standard axis. Moreover, included in the attitude adjustment device is a third adjustment mechanism to adjust the angle of the second detector such that the detection axis of the second detector becomes parallel to the first plane. A fourth adjustment mechanism is included to adjust the angle of the second detector such that the detection axis of the second detector becomes perpendicular to the second plane.

Finally, the present invention provides a method for adjusting the angular relationship between an angular velocity meter of a photographic device and the photographic device. The photographic device comprises a photographic optical system, an angular velocity meter, and an adjustment member to adjust the angular relationship between a baseplate of the adjustment member and a housing of the photographic device. The method includes the step of causing a rolling motion to be realized by the photographic device. The rolling motion occurring about an optical axis of the photographic optical system. Also, the method includes the step of adjusting the angular relationship between the angular velocity meter and the photographic device.

BRIEF DESCRIPTION OF THE DRAWINGS

The present invention is described by example and with reference to the accompanying drawing figures of which.

DETAILED DESCRIPTION OF THE PREFERRED EMBODIMENTS

Figure 1:
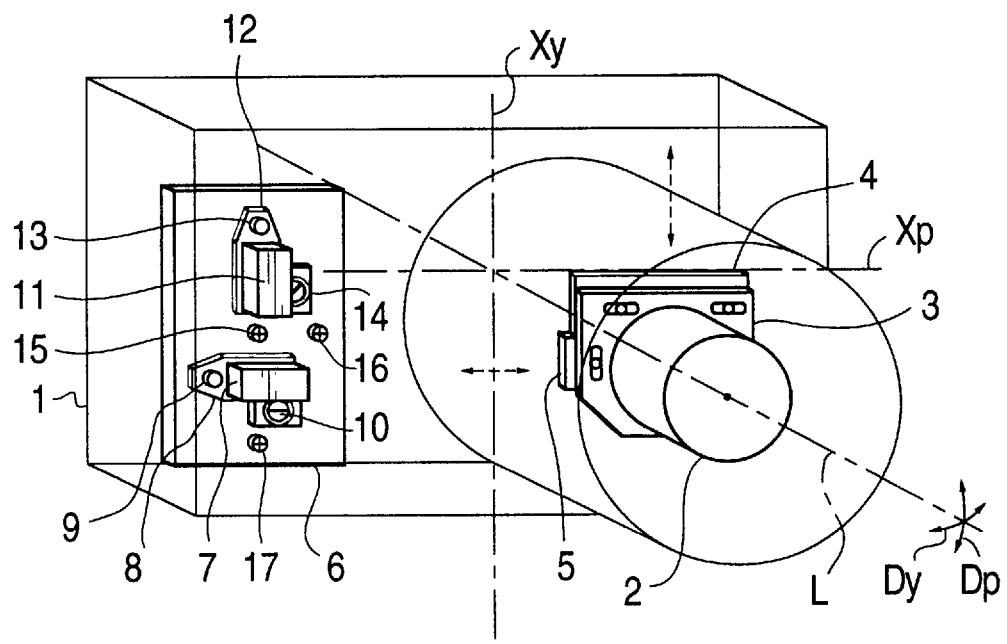
FIG. 1 is a schematic diagram which illustrates an arrangement of a camera according to a first embodiment of the present invention.

The present invention is described below with reference to the drawing figures which were briefly described above. Like parts will be referred to with like reference numerals.

A first embodiment of the present invention is depicted in FIG. 1. Accordingly, camera housing or body 1 includes a correcting optical system 2 which is arranged in a photographic lens barrel. Correcting optical system 2 corrects image blurs due to blurring motions and camera tremor. Correcting optical system 2 includes a portion of the photographic optical system, for example, in a manner similar to that disclosed in JP-2-234115 by the present Applicant and can be moved in an up and down direction and in a left and right direction and in a plane orthogonal to the optical axis L of the photographic optical system. Frame 3 is integrated with the correcting optical system 2. A pitch correction drive plate 4 and a yaw correction drive plate 5 are coupled to frame 3 by slotted holes and pins.

Frame 3, according to the movement of the pitch correction drive plate 4 in the camera in up and down directions, and the movement of the yaw correction drive plate 3 in the camera in left and right directions, moves in up and down, and right and left directions and in a plane orthogonal to the optical axis L of correcting optical system 2. Because the drive mechanism of correcting optical system 2 has no direct relationship on the inventive aspects of the present invention, a detailed description of such a drive mechanism is omitted. The accuracy of the drive direction of frame 3, by way of correction drive plates 4 and 5, is one of high precision.

Figure 2A:
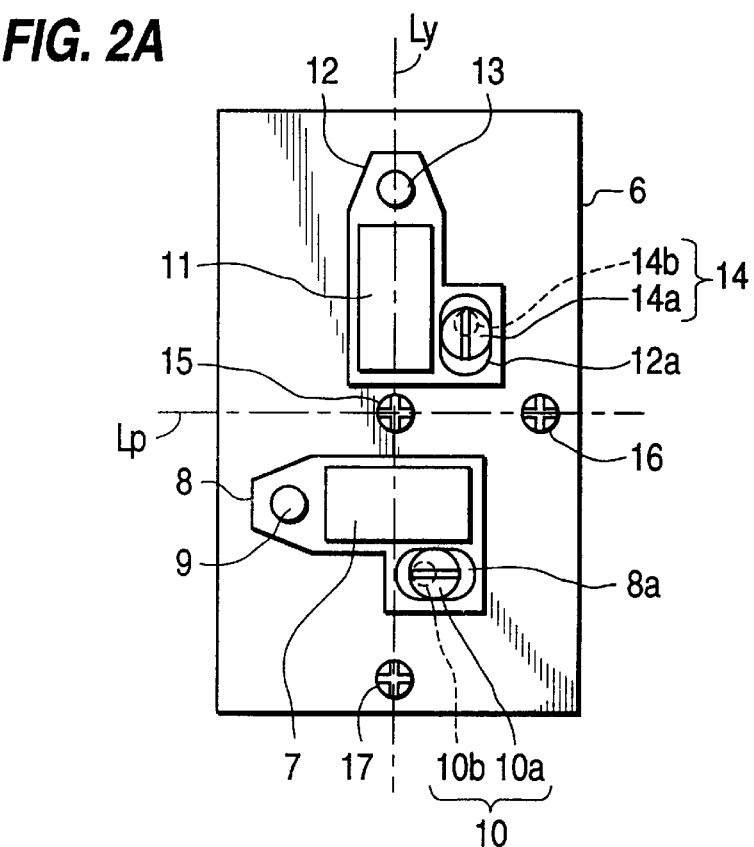
FIGS. 2A and 2B are diagrams which respectively show plan and side views of the angular velocity meter and its attitude adjustment device depicted in FIG. 1.
Figure 2B:
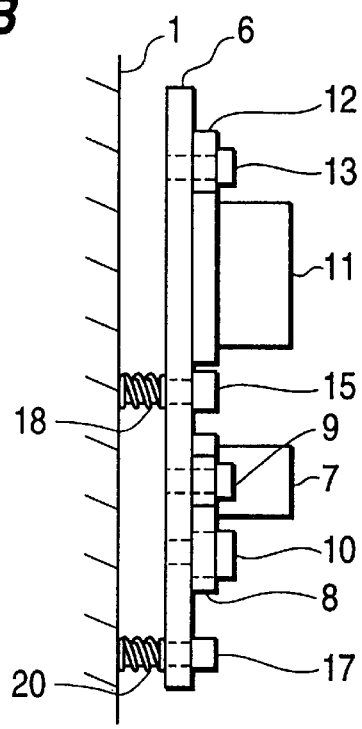

Baseplate 6 is located in housing 1. Mounted on baseplate 6, as shown in the enlarged view of FIG. 2, is a vibrating type of angular velocity meter 7 for use in pitch detection and an angular velocity meter 11 for use in yaw detection (referred to below as "pitch meter" and "yaw meter"). The pitch meter and the yaw meter are respectively mounted via a pitch adjustment plate 8 and yaw adjustment plate 12. Moreover, a circuit pattern is formed on baseplate 6 to allow the outputs of each angular velocity meter 7 and 11 to be traced.

The pitch angular velocity meter 7 is mounted perpendicular to the optical axis L of a photographic optical system, and is used to detect angular velocities (angular velocities in the Dp direction) around the pitch rotation axis Xp extending in a camera's up and down directions. Moreover, the yaw angular velocity meter 11 is used to detect angular velocities (angular velocities in the Dy direction) around the yaw rotation axis Xy extending in a camera's left and right directions.

The above-mentioned pitch adjustment plate 8 is mounted to swing freely within a predetermined range along baseplate 6 by way of a pitch pin 9. An eccentric pin 10 is used for performing pitch adjustment. Eccentric pin 10's head 10*a* is located in a slotted hole 8*a* arranged in an extended portion of adjustment plate 8, and pin 10's shaft portion 10*b* is rotatably fitted into baseplate 6. On rotating the eccentric pin 10 for pitch adjustment, head portion 10*a* rotates eccentrically to shaft portion 10*b* and causes motion of the slotted hole 8*a*, and in this manner, the pitch adjustment plate 8 swings with pitch pin 10 as center, and changes the angle of the pitch angular velocity meter 7.

Yaw adjustment plate 12 is mounted to swing freely within a predetermined range along baseplate 6. Yaw adjustment plate 12 is centered on a yaw pin 13 and rotates upon a yaw adjustment eccentric pin 14. Accordingly, the angle of the yaw angular velocity meter 11 is changed.

Baseplate 6 is mounted on housing 1 via a center pin 15, a pitch deviation adjustment screw 16, and a yaw deviation adjustment screw 17. Each screw 15–17 is jacketed by a spring 18–20 (19 not shown in the drawing) and normally urged in a camera forward direction. The center screw 15 is located at the approximate center of baseplate 6. The pitch deviation adjustment screw 16 is located at a position separated from center screw 15 in the axis Lp (an axis parallel to the pitch rotation axis Xp) direction by a predetermined spacing. Moreover, the yaw deviation adjustment screw 17 is located at a position separated from the above-mentioned center screw in the Ly axis (an axis parallel to the yaw rotation axis Xy) direction by a predetermined spacing. Thus, the pitch deviation adjustment screw 16, center screw 15 and yaw deviation adjustment screw 17 are located so as to form a right angle triangle with the center pin 15 at the right angled vertex.

The attitude adjustment sequence of angular velocity meters 7 and 11 will next be described with reference to FIGS. 3 and 4.

Figure 3:
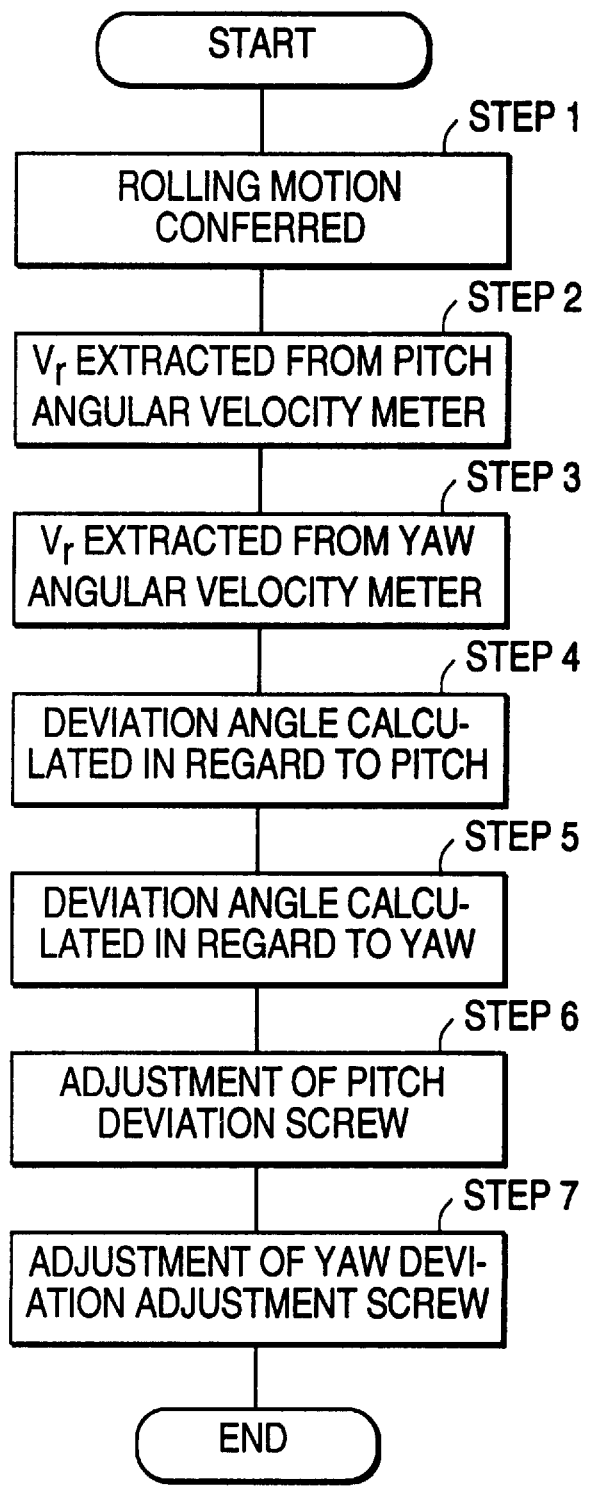
FIG. 3 is a flow chart which illustrates operational flow of attitude adjustment operations of the embodiment depicted in FIG. 1.

Referring now to FIG. 3, therein depicted is an adjustment sequence which is used to prevent roll blur effects from becoming included in the output of each angular velocity meter 7, 11. Roll blur effects are typically present when a rolling motion is realized which is a rotary motion and not a DC type or AC type of motion which is often realized by a motor device. It will be appreciated that in order to detect normal angular velocity meter output, a high pass filter preferably is used (i.e., in order to eliminate drift, etc., of a 0 or null output), because it is difficult to observe accurate output when continuing to realize a one-sided rotation (i.e., rotation in only one direction).

First, in step 1, a predetermined rolling motion is conferred upon camera 1 (i.e., a rolling motion force is applied to camera 1). Rolling motion is a rotary motion with the optical axis L of the photographic optical system as center axis. Because the detection axis of each angular velocity meter has not been adjusted and due to the above-mentioned rolling motion, the pitch angular velocity meter 7 and the yaw angular velocity meter 11 corresponding to the deviation angle from the direction of the optical axis L emit outputs Vr (see the above-mentioned Equation (2)).

In step 2, the output Vr of the pitch angular velocity meter 7 is extracted, and in step 3, the output Vr of the yaw angular velocity meter 11 is extracted.

In step 4, the deviation angle corresponding to $\gamma$ of Equation (2) is calculated from the output Vr of the pitch angular velocity meter 7 obtained in step 2.

In step 5, the deviation angle corresponding to $\gamma$ of Equation (2) is calculated from the output Vr of the yaw angular velocity meter 11 obtained in step 3.

When the deviation angle of the detection axis angular velocity meters 7 and 11 has been ascertained, an adjustment action is performed to eliminate the deviation angle of each detection axis. In particular, in step 6, the pitch deviation adjustment screw 16 is either tightened or slackened. By the operation of this screw 16, baseplate 6 with the axis Ly shown in FIG. 2(*a*) is swung in the camera. The angle of the pitch angular velocity meter 7 is changed. Accordingly, the detection axis of the pitch angular velocity meter 7 is changed to a direction which becomes parallel to a plane orthogonal to the optical axis L, namely a plane parallel to the pitch rotation axis Xp (i.e., a first plane). Thus, when screw 16 is manipulated by an appropriate amount to eliminate the deviation of the detection axis of the pitch angular velocity meter 7 calculated in step 4, the detection axis of the pitch angular velocity meter 7 becomes parallel to the above-identified first plane.

Through adjustment of the pitch deviation adjustment screw 16, baseplate 6, relative to the yaw rotation axis Xy, does not deviate. Accordingly, the angle between the detection axis of the yaw angular velocity meter 11 and the first plane does not change.

Because the above-mentioned axis Ly passes through the center portion of baseplate 6 when the above-mentioned screw 16 is operated the amount of rotation of baseplate 6 becomes distributed. The left and right end portions of baseplate 6 are moved an amount that can be reduced to a minimum limit. Accordingly, even though the excess space around baseplate 6 in the camera housing 1 is comparatively small, the attitude adjustment operation is performed via the pitch deviation adjusting screw 16. Moreover, because the pitch angular velocity meter 7 and the yaw angular velocity meter 11 are positioned approximately symmetrically relative to the above-mentioned axis Ly, by adjustment of the pitch deviation adjusting screw 16 the amount of rotation of both angular velocity meters 7 and 11 can be kept down to a minimum. Additionally, it is possible to make the width of baseplate 6 small in the left and right directions. Accordingly, the above-described structure provides an advantage that the space around baseplate 6 can be small.

In step 7, the yaw deviation adjustment screw 17 is tightened or loosened by an amount appropriate to eliminate the deviation of the detection axis of the yaw angular velocity meter 11 as calculated in step 5. By the operation of screw 17, baseplate 6 swings in the camera centered on the axis Lp, thus changing the yaw angle of the angular velocity meter 11. The detection axis of the yaw angular velocity meter 11 can, in this manner, be made parallel to the above-mentioned first plane. Moreover, baseplate 6 does not deviate relative to the pitch rotation axis due to the adjustment of the yaw deviation adjusting screw 17. Accordingly, the angle between the detection axis of the pitch angular velocity meter 7 and the first plane does not change.

Because the up and down width of baseplate 6 is larger than the left and right width, the amount of movement of baseplate 6 in a direction of the up and down end portions in the camera when operating the screw 17 becomes somewhat larger than during the above-mentioned adjustment of the pitch angular velocity meter 7. However, because the above-mentioned axis Lp passes through the center portion of baseplate 6, the amount of rotation of baseplate 6 during operation of the screw 17 becomes distributed to the left and right, and accordingly the amount of movement of the up and down end portions of baseplate 6 can be reduced to a minimum. Moreover, among electrical components other than the angular velocity meters mounted on baseplate 6, by positioning those which are comparatively small (those with a low mounting height) at the top and bottom ends of baseplate 6, it is possible to take a large amount of space for adjustment. Furthermore in this embodiment, the excess space can be made comparatively large at the top and bottom and left and right end portions of baseplate 6.

By way of the sequence depicted in FIG. 3, the detection axis of each of the pitch angular velocity meter 7 and the yaw angular velocity meter 11 become approximately parallel to the above-mentioned first plane. Accordingly, V in the above-mentioned Equation (2) becomes about zero, and a rolling motion component applied to the camera does not become included in the outputs of the two angular velocity meters 7, 11.

Moreover, the process of the above-mentioned step 4 is carried out after rolling motion is continuously applied. Thereafter, step 2 and step 3 in reducing rolling motion are performed once the camera becomes stationary in step 4. Moreover, the above-mentioned steps may be repeated until the necessary precision is obtained, that is, until the output of each of angular velocity meters 7 and 11 in regard to rolling motion becomes about zero. Furthermore, at the conclusion of the above-listed adjustment operations, if each adjustment screw or kind of screw is fixed with adhesive or the like, the reliability with regard to changes which occur with the passage of time is increased.

As described above, if the deviation angle is ±3 degrees or less, the absolute value of the detection error of the angular velocity meter can be about 5% or less. For example, in the case of image blur prevention in a camera, because it is considered necessary to keep the degree of error down, the adjustment operation may as a rule be performed until the deviation angle is ±3 degrees or less. In other words, adjustments such that rolling motion (angular velocity)× sensitivity or angular velocity meter becomes ±5% or less.

Accordingly, from the discussions above, the desired performance of the respective devices to which the present invention relates differs. Thus, the target values of the adjustment mechanisms of the present invention do not have to be set at a fixed value. Specifically, there are no cases in which 5 degrees is sufficient, and in contrast, there are cases in which 1 degree or less is necessary.

Next, while maintaining the above-mentioned pitch angular velocity meter 7 and yaw angular velocity meter 11 respectively in a state parallel to the first plane, the operation is performed of adjusting the inclination of each of the angular velocity meters 7, 11 such that the detection axes of the two angular velocity meters 7, 11 are in agreement with the directions of the pitch rotation axis Xp and the yaw rotation axis Xy. This step is in order to prevent yaw blur components being included in the output of the pitch angular velocity meter 7 or pitch blur components being included in the output of the yaw angular velocity meter 11.

Figure 4:
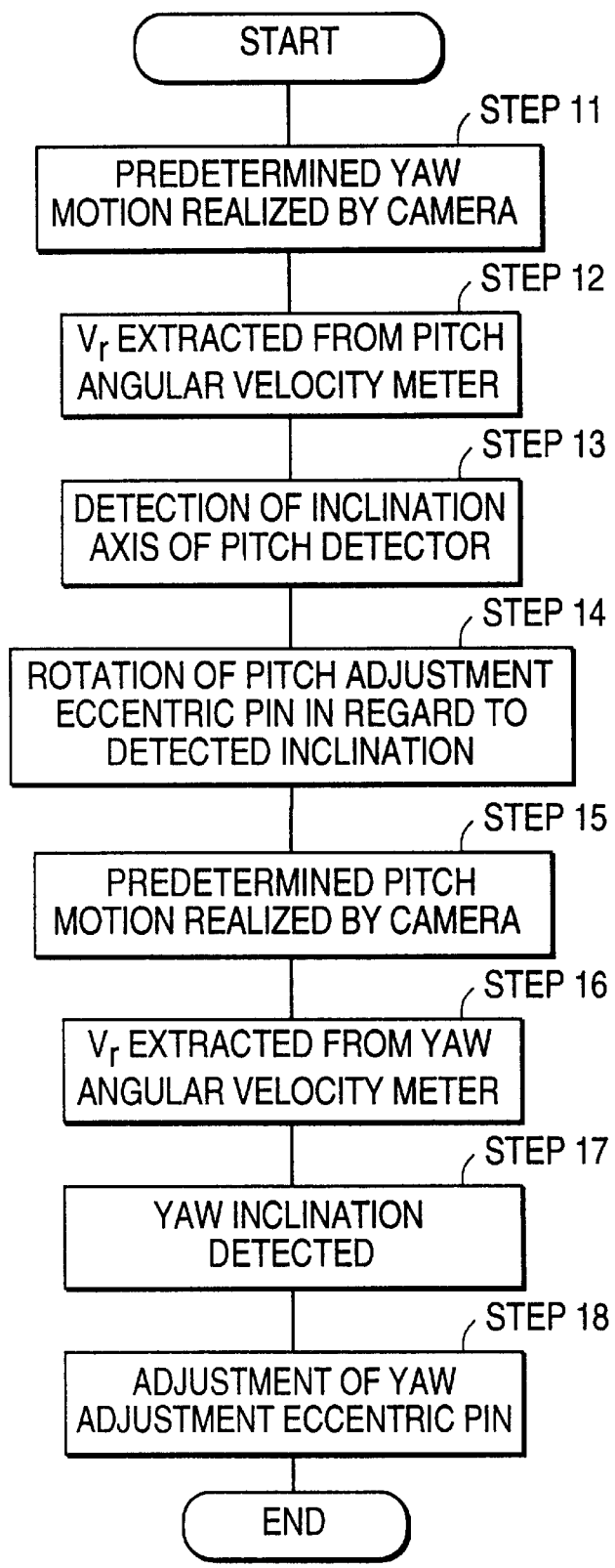
FIG. 4 is a flow chart which illustrates further operational flow of attitude adjustment operations.

Referring now to FIG. 4, at step 11, a predetermined yaw motion is conferred on the camera and in step 12, the output of pitch angular velocity meter 7 is detected. As mentioned above, in the case in which the detection axis of the pitch angular velocity meter 7 is inclined relative to the pitch rotation axis Xp, an output in proportion to such an angle of inclination is output from pitch angular velocity meter 7. In step 13, the inclination of the detection axis of pitch angular velocity meter 7 relative to the pitch rotation axis Xp is calculated from the output obtained in step 12. In step 14, the pitch adjustment eccentric pin 10 is rotated in a predetermined direction by an amount appropriate to the calculated inclination. Accordingly, pitch adjustment plate 8 along with pitch angular velocity meter 7, swings on baseplate 6. The detection axis of the pitch angular velocity meter 7 becomes parallel to the pitch rotation axis Xp and also parallel to the second plane orthogonal to the abovementioned first plane (i.e., a plane orthogonal to the yaw rotation axis Xy). As a result, yaw motion components are no longer included in the output of the pitch angular velocity meter 7.

In step 15, a predetermined pitch motion is conferred on the camera, and in step 16 the output of the yaw angular velocity meter 11 is detected. In the case in which the detection axis of the yaw angular velocity meter 11 is inclined relative to the yaw rotation axis Xy, an output in proportion to this angle of inclination is output from the yaw angular velocity meter 11. In step 17, the inclination of the detection axis of the yaw angular velocity meter 11 relative to the yaw rotation axis Xp is calculated from the output obtained in step 16. In step 18, the yaw adjustment eccentric pin 14 is rotated in a predetermined direction by an amount appropriate to the calculated inclination. Accordingly, the yaw adjustment plate 12 and the yaw angular velocity meter 11, swings on baseplate 6. Thus, the detection axis of the yaw angular velocity meter 11 becomes orthogonal to the above-mentioned second plane. As a result, pitch motion components are no longer included in the output of the yaw angular velocity meter 11.

In construing the embodiment depicted in FIG. 1, the camera casing or housing 1 constitutes the physical object to be detected, the pitch angular velocity meter 7 and yaw angular velocity meter 11 are the first and second detectors, the pitch rotation axis Xp is the standard axis, the baseplate 6 and the pitch deviation adjustment screw 16 are the first adjustment mechanism, the pitch adjustment plate 8, pitch pin 9 and pitch adjustment eccentric pin 19 are the second adjustment mechanism, the baseplate and the yaw deviation adjustment screw 17 are the third adjustment mechanism, the yaw adjustment plate 12, yaw pin 13 and yaw adjustment eccentric pin 14 are the fourth adjustment mechanism, the axis Ly is the up and down direction swing axis, and the axis Lp is the right and left direction swing axis.

Moreover in the embodiment described above, the adjustment of the inclination of the detection axes is performed after the deviation of the detection axes of the pitch angular velocity meter 7 and yaw angular velocity meter 11 from the plane orthogonal to the optical axis L has been adjusted. However, because these adjustments are performed independently of each other, it is of course of no importance if they are performed in the reverse order or in any other order.

A second embodiment example will next be described with reference to FIG. 5.

Figure 5:
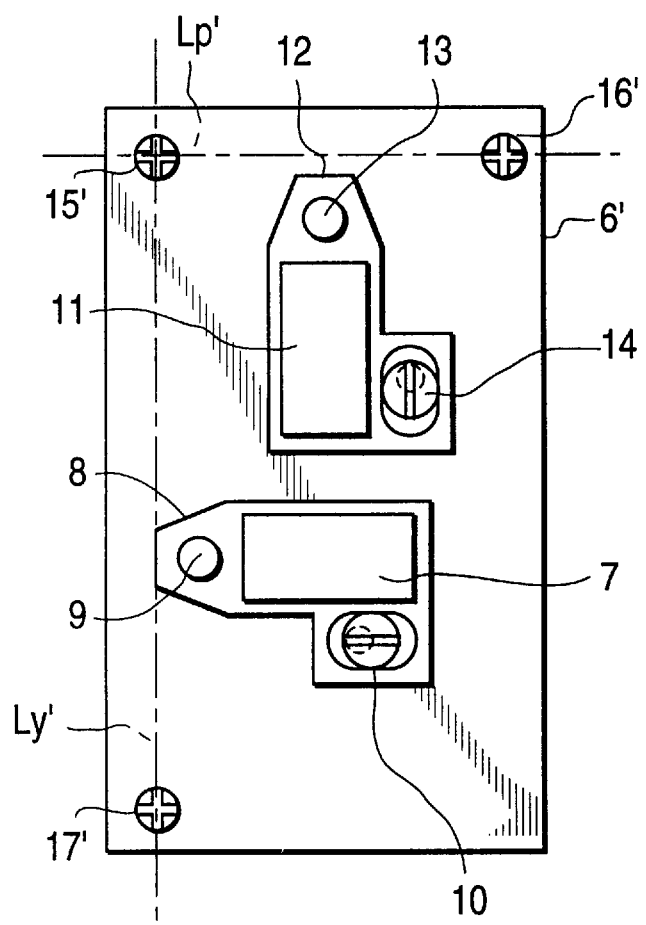
FIG. 5 is a plan view of an attitude adjustment device according to a second embodiment example.

In FIG. 5, the baseplate 6' is basically similar to the baseplate 6 shown in FIG. 2, but in the present embodiment the pitch deviation adjusting screw 16', the center screw 15' and the yaw deviation adjusting screw 17' are positioned in the end portions of the baseplate as shown in the drawing. Accordingly, when the pitch deviation adjusting screw 16' and the yaw deviation adjusting screw 17' rotate, baseplate 6' respectively swings in the camera front and rear directions, centered on the axes Ly' and Lp'. If these pins are thus positioned, because screw holes in the center portion of the baseplate become unnecessary, each angular velocity meter 7, 11 can be positioned nearer the center of the baseplate 6' than in the case of FIG. 2, and the excess space for the sake of adjustments can be taken larger, in addition to which the restrictions on the position of the circuit pattern on the baseplate 6' become small and the degrees of design freedom are increased.

Moreover in the above-mentioned screw positions, because each axis Ly', Lp' is positioned at one end side of the baseplate 6', the amount of movement of the other end side of the baseplate 6' becomes large in an adjustment method similar to that of the first embodiment discussed above. Consequently, during pitch deviation adjustment, if the adjustment method is used in which, after tightening the pitch deviation adjusting screw 16' by half the necessary tightening amount, the center screw 15' and the yaw deviation adjusting screw 17' are loosened by a similar amount, the final swing amount of the baseplate 6' can be the same as in the first embodiment, and it becomes unnecessary to increase the excess space around the baseplate.

Figure 6A:
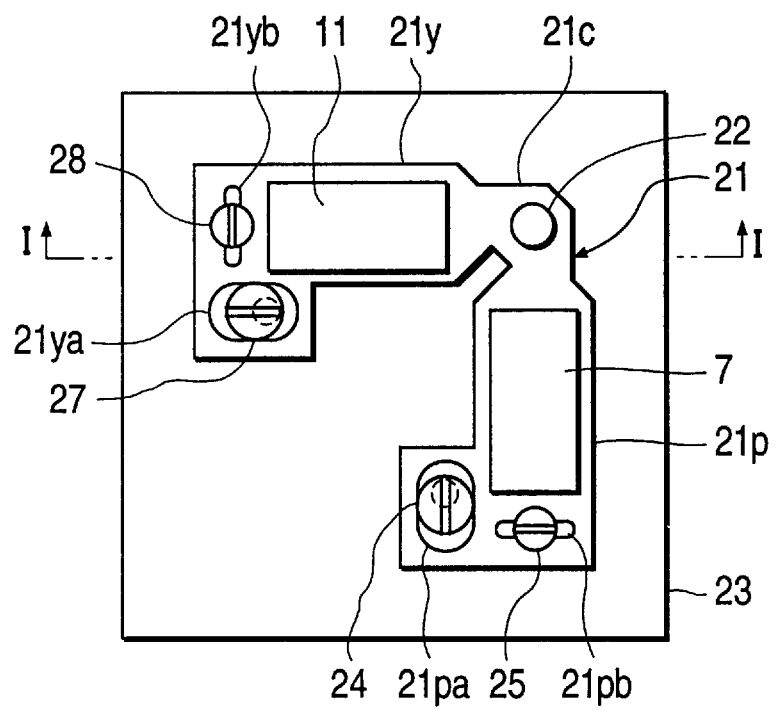
FIGS. 6A and 6B are diagrams which respectively show a plan view and a cross-sectional view taken along the line 1—1 of an attitude adjustment device according to a third embodiment of the present invention.

A third embodiment of the present invention is next described with reference to FIG. 6. In FIG. 6, a detection axis inclination adjustment plate 21 having an amount of transformability has a pitch side mounting portion 21p and a yaw side mounting portion 21y, and each of the pitch angular velocity meter 7 and yaw angular velocity meter 11 is mounted on the respective mounting portion 21p and 21y. Adjustment plate 21 is fixed to baseplate 23 via an adjustment plate pin 22 in a portion 21c connecting both mounting portions 21p and 21y. The front end of the pitch side mounting portion 21p is perforated by two mutually orthogonal slotted holes 21pa and 21pb. Accordingly, a pitch inclination adjusting eccentric pin 24 is screwed into the baseplate 23. Moreover, via the slotted hole 21b on the other side, a pitch deviation adjusting screw 25 is screwed into the baseplate 23. Furthermore, the shaft portion of the pitch deviation adjusting screw 25, which is used to urge the inclination adjustment plate 21 in the camera forward direction, is surrounded by a pitch deviation adjusting spring (not shown in the drawing).

Figure 6B:
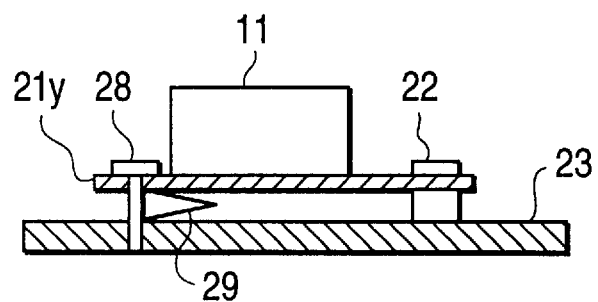

Similarly, on the yaw side mounting portion 21y, a yaw inclination correcting eccentric pin 27 and a yaw deviation correcting screw 28 are arranged via slotted holes 21ya and 21yb, and the shaft portion of the screw 28 is surrounded by a yaw deviation correcting spring 29 (FIG. 6(b)).

When the pitch deviation adjusting screw 25 rotates, the adjustment plate 21, by transformation in the connecting portion 21c by an amount proportional to the amount of its operation, the pitch side mounting portion 21p swings in the camera front and rear directions. Accordingly, the angle of the pitch angular velocity meter 7 changes and the deviation from the first plane (surface orthogonal to the optical axis L) of the detection axis of the pitch angular velocity meter 7 can be eliminated. Moreover, by the operation of the yaw deviation adjusting screw 28, the deviation from the first plane of the detection axis of the yaw angular velocity meter 11 can be eliminated.

When the pitch inclination eccentric pin 24 operates, by a transformation of the connecting portion 21c of the detection axis inclination correction plate 21, the pitch side mounting portion 21p swings along the top surface of the baseplate 23, and the inclination relative to the pitch detection axis Xp of the pitch angular velocity meter 7 can be adjusted. Moreover, by the operation of the yaw inclination correcting eccentric pin 27, the yaw side mounting portion 21y swings along the top surface of the baseplate 23, and inclination relative to the yaw rotation axis Xy of the yaw angular velocity meter 11 can be adjusted.

In this embodiment, in order for a constitution to perform adjustment of each angular velocity meter 7, 11, a detection axis inclination adjustment plate 21 smaller than the baseplate 23 is moved. In comparison with the case in which the baseplate caused to swing in the first embodiment performs an adjustment, there is an advantage that the circumferential margin of space is kept small. Moreover, because it is not necessary to mount the baseplate 23 to swing freely in the camera casing 1, the operation of mounting it is easy, and in addition it can be given a comparative degree of freedom with regard to positional location. In the case in which wiring is performed from the baseplate 23 to other baseplates, the wiring design and assembly may be easily performed.

A fourth embodiment of the present invention is described with reference to FIGS. 7A and 7B.

In the above-mentioned embodiments, examples were shown in which the attitude adjustment of the two angular velocity meters 7 and 11 was performed after the pitch and yaw angular velocity meters 7 and 11 had been mounted to the camera casing 1, but in the present embodiment, an example is shown in which respective attitude adjustments are performed before the two angular velocity meters 7 and 11 are mounted on the camera.

Figure 7A:
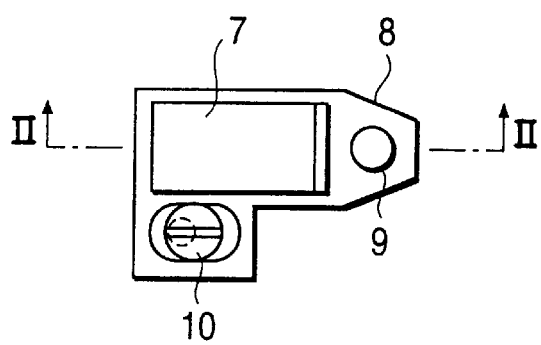
FIGS. 7A and 7B are diagrams which respectively show a plan view and a cross-sectional view taken along the line 1—1 of an attitude adjustment device according to a fourth embodiment of the present invention.
Figure 7B:
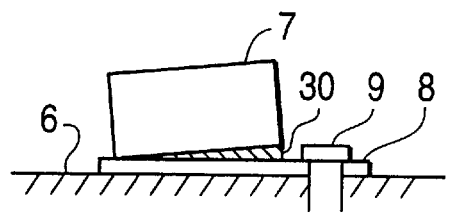
Figure 8:
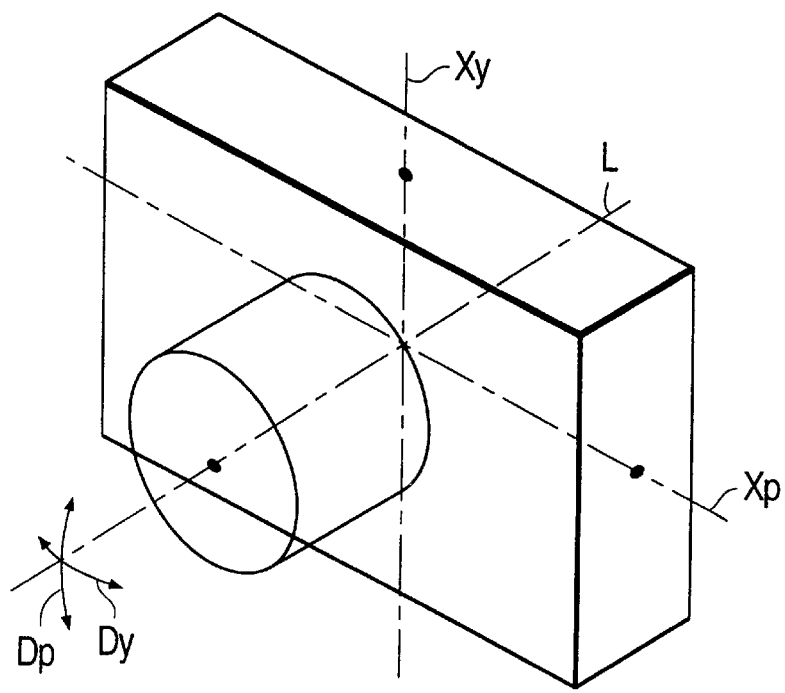
FIG. 8 is a diagram which illustrates relative directions of a camera.
Figure 9:
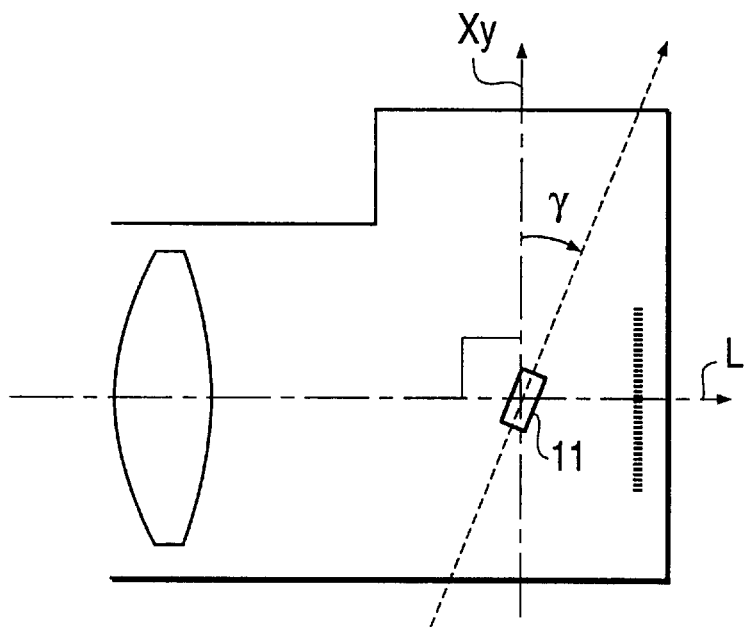
FIG. 9 is a diagram which illustrates problems related to image blurring around a camera's optical axis.

In FIGS. 7A and 7B, the pitch angular velocity meter 7 is mounted via a pitch deviation adjustment spacer 30 on a pitch adjustment plate 8. The pitch deviation adjustment spacer 30 is for adjustment such that the detection axis of the pitch angular velocity meter 7 becomes parallel to the bottom surface (surface contacting the baseplate 6) of the pitch adjustment plate 8, for example, are plural different angle ones previously placed in readiness. The bottom surface of the pitch adjustment plate 8 and the detection axis of the angular velocity meter 7 are adjusted in stages to achieve the desired parallelism. The pitch angular velocity meter 7 and integrated pitch adjustment plate 8 are mounted to swing freely on the baseplate 6 by the pitch pin 9. Moreover, not shown in the drawing, the yaw angular velocity meter 11 is also mounted in a similar manner on a yaw adjustment plate via a yaw deviation adjustment spacer.

The sequence of assembly of each angular velocity meter 7 and 11 to the camera casing 1 will next be described.

First, the pitch angular velocity meter 7 is mounted on the pitch adjustment plate 8 such that its detection axis is parallel to the bottom surface of the pitch adjustment plate 8. For this purpose, a rotary motion is conferred in a plane parallel to the bottom surface of the pitch adjustment plate 8, and at this time the angle of the angular velocity meter 7 may be adjusted via the spacer 30 such that the output from the pitch angular velocity meter 7 becomes approximately zero. Circuits used to extract the output of the pitch angular velocity meter 7 are separately arranged. Moreover, the attitude adjustment of the yaw angular velocity meter 11 is performed in the same kind of sequence as that depicted in FIGS. 3 and 4.

Next, baseplate 6 is mounted in a unitary state on the camera casing 1. During this operation, the front surface of the baseplate 6 is set perpendicular to the optical axis L of the photographic optical system. The mounting of this baseplate 6, for example, similarly to the baseplate 6 as shown in FIG. 5, three mounting screws are located, and may be fastened by screwing these screws into predetermined projections (not shown in the Figure) for mounting use protruding from the camera body 1. Namely, if constituted to fix the corner portion of baseplate 6 with screws, because the span between the respective mounting projections can be kept comparatively long, even if there is variability in the amount of length of the various projecting portions, the deviation angle of the baseplate 6 can be made minimally small, the mounting precision of the baseplate 6 with respect to the optical axis of the photographic optical system, namely the mounting precision such that it becomes perpendicular relative to the optical axis, can be enhanced.

After the mounting discussed above, the above-mentioned pitch adjustment plate 8 with the pitch angular velocity meter 7 mounted to it is swingably mounted on the front surface of the baseplate 6 via the pitch pin 9 and pitch adjustment eccentric pin 10, and the yaw adjustment plate with the yaw angular velocity meter 11 mounted to it is similarly mounted on the baseplate 6. As mentioned above, the detection axes of the pitch angular velocity meter 7 and the yaw angular velocity meter 11 are adjusted in attitude to be parallel to the bottom surface of the respective mounting plate, and on the other hand, because the baseplate 6 is mounted such that its front surface is orthogonal to the optical axis L, when each adjustment plate is mounted to the baseplate 6, the detection axis of each angular velocity meter 7 and 11 becomes parallel to the above-mentioned first plane orthogonal to the optical axis L.

Finally, by operating the pitch adjustment eccentric pin 10 and the yaw adjustment eccentric pin 14, the inclinations with respect to the respective rotation axes Xp and Xy of the detection axes of the respective angular velocity meters 7 and 11 are adjusted. In this state, roll blur components and yaw blur components are not included in the output of the pitch angular velocity meter 7, and roll blur components and pitch blur components are not included in the output of the yaw angular velocity meter 11.

By way of the present embodiment, each angular velocity meter 7 and 11, because adjustment operations are performed in order to eliminate the deviation of optical axis direction of their detection axes, the working properties are good compared to the case of performing adjustment operations after mounting in the camera casing 1.

Moreover, as mentioned above, if the baseplate 6 is mounted by screws to the camera casing 1, because comparatively good precision of mounting can be obtained with respect to the pitch rotation axis Xp and yaw rotation axis Xy of the baseplate, the inclination adjustment with respect to the rotation axes Xp and Xy of the detection axes of the respectively angular velocity meters 7 and 11 may be performed with respect to the baseplate 6. In this manner, each angular velocity meter 7 and 11 is mounted on the baseplate 6, and because the attitude adjustments can all be concluded before the baseplate is mounted on the camera casing 1, the working properties are still better.

In each embodiment described above, because the direction relative to the baseplate of the two angular velocity meters 7 and 11 is changed during attitude adjustment operations, the wiring of the baseplate and the angular velocity meters is conveniently performed using a flexible printed board or lead wires. Moreover, arranging a circuit pattern on the adjustment plate on which the angular velocity meter is mounted, and in addition fixedly soldering this mounting plate and angular velocity meter and mounting plate, the adjustment plate and the baseplate, as mentioned above, may be wired with a flexible printed board or lead wires. In particular, in the embodiment of FIG. 7, the sandwiched state of the deviation adjustment spacer allows the angular velocity meter and the adjustment plate to be fixedly soldered together.

Moreover in the above described embodiment, a description has been given of the attitude adjustment device of an angular velocity meter. However, the present invention can also be applied to an attitude adjustment device of an angular accelerometer. Moreover, the object on which these detectors are mounted is not limited to a camera, but may include such devices as telescopes, microscopes, binoculars, and other optical instruments.

Having now fully described the present invention as exemplified in the attached drawings, it will be readily appreciated by those skilled in the art to which the present invention pertains that many modifications, additions, and/or enhancements may be made to the present invention the scope of which is defined in the appended claims and equivalents thereof.

What is claimed is:

1. An attitude adjustment device for use with a detector device, wherein said detector device detects motion about an optical axis of an optical instrument, said attitude adjustment device comprising:

a first adjustment mechanism which adjusts said detector device about a first angle;

a second adjustment mechanism which adjusts said detector device about a second angle; and a baseplate on which said first and second adjustment mechanisms are mounted, wherein said baseplate is mounted in said optical instrument substantially perpendicular to said optical axis.

2. The attitude adjustment device according to claim 1, wherein said detector device is an angular velocity meter to detect rotational speed about said optical axis.

3. The attitude adjustment device according to claim 1, wherein said first adjustment mechanism has a standard axis which is orthogonal to said optical axis.

4. An attitude adjustment device including first and second detectors having respective first and second detection axes mounted in a camera, said attitude adjustment device comprising:

a first adjustment mechanism to adjust a first angle of said first detector with respect to a first plane;

a second adjustment mechanism to adjust a second angle of said first detector with respect to a second plane orthogonal to said first plane;

a third adjustment mechanism to adjust a first angle of said second detector with respect to the first plane;

a fourth adjustment mechanism to adjust a second angle of said second detector with respect to said second plane; and a substantially planar member connecting said first and third adjustment mechanisms.

5. The attitude adjustment device according to claim 4, wherein said first detector is adjusted substantially orthogonal to an optical axis of said camera.

6. The attitude adjustment device according to claim 4, wherein said first and third adjustment mechanisms are respective first and second swingable mounting members disposed in said camera and in a plane parallel to a mounting plane of said first swingable mounting member.

7. The attitude adjustment device according to claim 4, wherein said first and second detectors are angular velocity detectors to detect speeds of rotation around respective detection axes.

8. The attitude adjustment device according to claim 5, wherein said first and second detectors are angular velocity detectors to detect speeds of rotation around respective detection axes.

9. The attitude adjustment device according to claim 5, wherein said first and second detectors are angular velocity detectors to detect speeds of rotation around respective detection axes.

10. The attitude adjustment device according to claim 4, wherein said first and second detectors are angular velocity detectors to detect speeds of rotation around respective detection axes.

11. An attitude adjustment device adapted for use in a camera, comprising:

an angular velocity meter;

a substantially planar baseplate on which said angular velocity meter is mounted, said baseplate being movably mounted within said attitude adjustment device;

a first adjustment member to adjust an angular relationship between said angular velocity meter and said baseplate; and a second adjustment member to adjust an angular relationship between said angular velocity meter and said baseplate.

12. The attitude adjustment device according to claim 11, wherein said angular velocity meter is a vibration type angular velocity meter.

13. A still camera to effect recordation with regard to a recording medium, comprising:

an optical system having an optical axis;

a plurality of angular velocity meters; and a baseplate on which said plurality of angular velocity meters are mounted, said baseplate being mounted in said optical instrument in substantially perpendicular relationship to said optical axis.

14. A method for adjusting an angular relationship between an angular velocity meter and an optical instrument in which said angular velocity meter is disposed, said method comprising the following steps:

causing a rolling motion to be realized by said optical instrument, said rolling motion occurring about an optical axis of said optical instrument;

adjusting the angular relationship between said angular velocity meter and said optical instrument by adjusting a first and a second adjustment mechanism; and adjusting a substantially planar baseplate on which said first and second adjustment mechanisms are mounted.

15. The method according to claim 14, wherein said rolling motion is alternating rolling motion.

16. An attitude adjustment device for adjusting a first and second angular velocity meter in a camera, comprising:

a substantially planar baseplate;

a first adjustment member which adjusts an angular relationship between the first angular velocity meter and said baseplate; and a second adjustment member, coplanar with the first adjustment member, which adjusts an angular relationship between said second angular velocity meter and said baseplate.

* * * * *